United States Patent Office

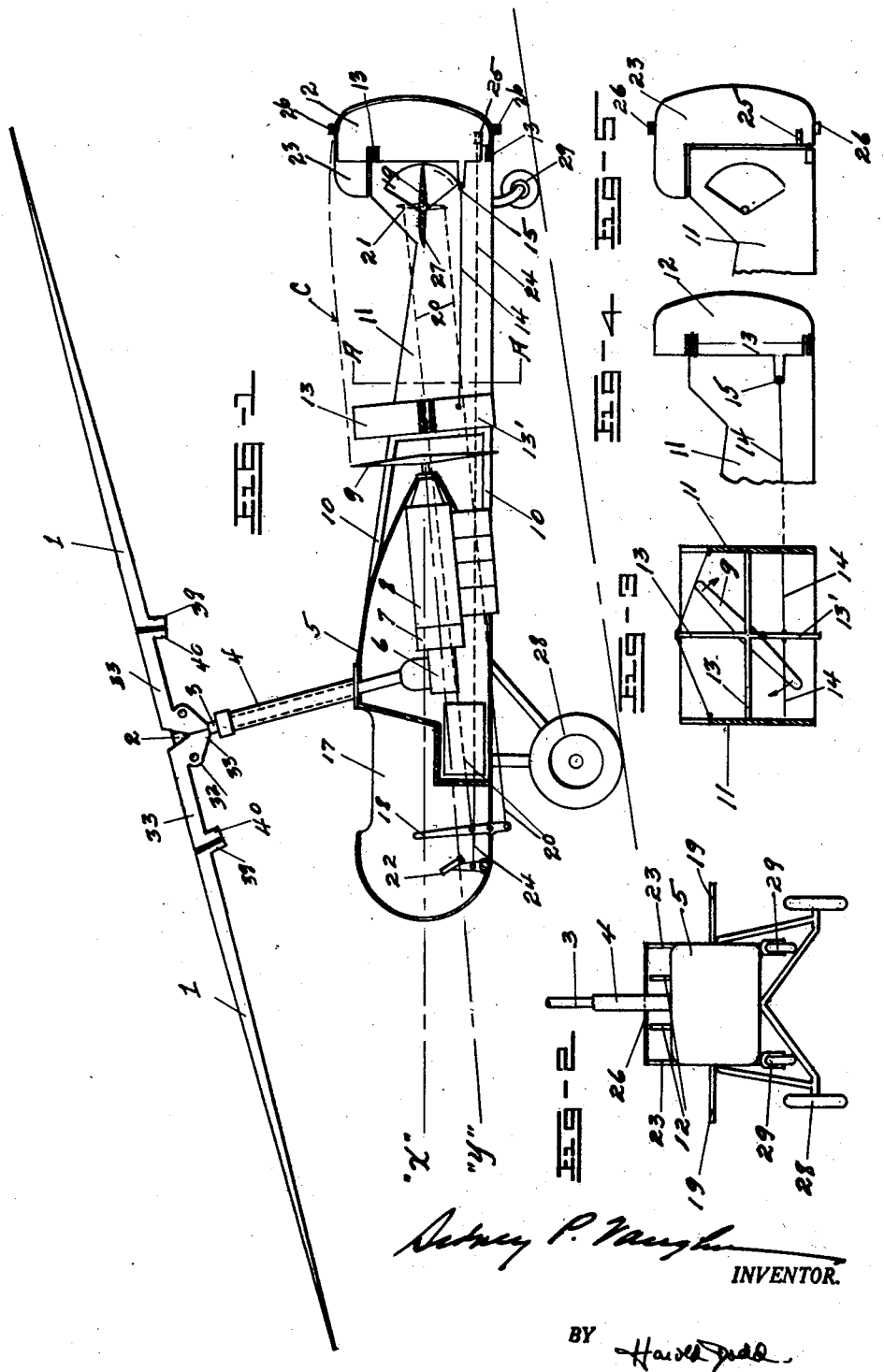

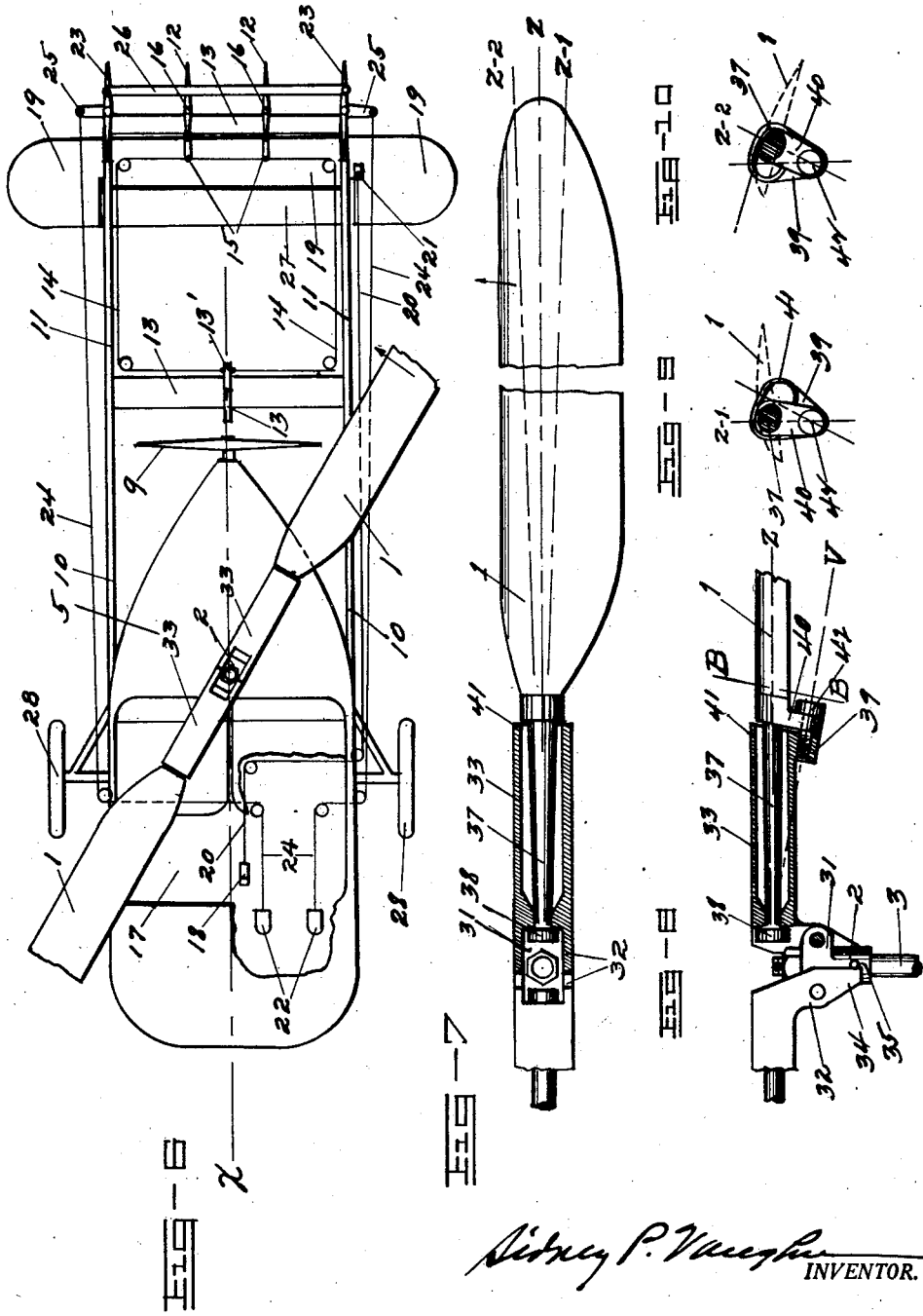

SIDNEY P. VAUGHN, OF THE UNITED STATES NAVY, ACKERMAN, MISSISSIPPI

HELICOPTER

Application filed June 2, 1930. Serial No. 458,988.

(GRANTED UNDER THE ACT OF MARCH 3, 1883, AS AMENDED APRIL 30, 1928; 370 O. G. 757)

The invention may be manufactured and used by or for the Government for governmental purposes without the payment to me of any royalty thereon.

This invention relates to a helicopter type of aircraft adapted for vertical flight, ascent and descent, hovering at a fixed altitude, horizontal flight and gliding.

The principal object is to provide a helicopter which is inherently stable, both statically and dynamically, and in which all torque is neutralized by rudders automatically operated by other surfaces actuated by the helical rotation of the propeller slip stream, and other fins placed in the slip stream.

Another object is to provide a helicopter with an inherently stable sustaining air screw forwardly inclined for horizontal translation and having a series of blades adapted to be articulated in fixed directions according to the resultant of the forces acting thereon, and which attain automatically a positive pitch when a torque is applied to the drive shaft and a negative pitch when the torque is removed.

A further object is to eliminate the use of ailerons for lateral balance by having the axis of the sustaining air screw forwardly inclined with reference to the longitudinal axis of the body and tail surfaces so that it will be possible to utilize the rudder as a control for lateral balance as well as for directional control. With this arrangement, the movement of the rudder in forward translation will swing the axis of the sustaining air screw laterally in a direction opposite to that of the tail and restore lateral balance.

Air passing through a propeller leaves the face of the blades with a pronounced tangential motion which causes it to follow a helical path for a considerable distance astern. The helical motion is very pronounced and at times the tangential component of velocity one fourth of the total resultant velocity in magnitude, and a projection of the lines of flow of the air on a plane parallel to the propeller axis and perpendicular to a radius at the point in question may be inclined twelve degrees or more to the axial line. Furthermore, the helical motion dies out very slowly unless dampened by obstructions behind the propeller. This helical motion is in the direction of rotation of the propeller, and the result of the rotation is to cause the air in the slip stream to strike a surface placed in the plane of symmetry on one side above the axis of the slip stream and on the other side below the axis of the slip stream, tending to cause the surface to rotate in the same direction as the propeller, and the moments are in direct proportion to the torque of the propeller.

It is this property that is utilized to the fullest throughout this invention to counteract automatically the torque of the propellers, and in order to counteract the torque of a single bladed sustaining air screw, an auxiliary propeller is adapted to direct its slip stream upon control surfaces forming a part of the tail unit and arranged to function automatically.

These and other objects will be readily apparent when the following detailed description is read in connection with the accompanying drawings in which like numerals and letters refer to like parts throughout the several views:

Fig. 1 is a sectional side elevation of the helicopter assumed to be in forward flight.

Fig. 2 is a front view of Fig. 1.

Fig. 3 is a view looking forward on line A—A Fig. 1.

Fig. 4 is a side elevation of one of the rudders provided to automatically counteract the torque of the sustaining air screw.

Fig. 5 is a side elevation of one of the rudders provided for lateral and directional control.

Fig. 6 is a plan view of Fig. 1.

Fig. 7 is a sectional plan view of one of the blades of the sustaining air screw.

Fig. 8 is a vertical sectional view of Fig. 7.

Figs. 9 and 10 are sectional views on line B—B Fig. 8 looking toward the hub.

Referring to Fig. 1 the helicopter illustrated has a single propelling and sustaining system in one unit in which a single multibladed lifting air screw is provided with blades 1 individually articulated to a common hub 2 attached to a drive shaft 3 rotatably mounted in a cylindrical column 4 extending upwardly from a nacelle body 5 above the center of gravity and inclined forward, or with the axis of the sustaining air screw so inclined with reference to the longitudinal axis "X" of the nacelle (which in normal flight is parallel with the direction of flight) that the upward thrust may have a forward horizontal component. The lower end of the drive shaft 3 of the sustaining air screw extends into the nacelle and is connected by a reduction gear 6 and clutch 7 to the forward end of the crank shaft of an engine 8 mounted longitudinally in the rear end of the nacelle. The rear end of the engine drive shaft drives a small pusher type of propeller 9 of such dimensions that the slip stream of the propeller when driven is of sufficient volume and velocity to actuate control surfaces forming a part of the tail unit.

A box type tail unit is provided and carried by four tail booms 10 extending rearwardly from the four corners of the nacelle 5 and spaced from the longitudinal axis of the nacelle a sufficient distance to allow the pusher propeller 9 to rotate freely. Beginning a short distance to the rear of the pusher propeller 9 the space between the upper and lower tail booms 10 on each side of the nacelle axis "X" is paneled to form large vertical fins 11 parallel with the axis of the pusher propeller and extending to the rudder assembly to form a kind of tunnel for the slip stream of the pusher propeller, and at the same time act as torque fins to counteract the torque of the sustaining air screw. The fins lie in the path of the rotating slip stream of the sustaining air screw and since the slip stream rotates with a helical motion in the same direction as the sustaining air screw, the air forming the slip stream will impinge upon that side of the fins 11 facing the leading edge of the oncoming air screw blade To be more specific, if the sustaining air screw shown in the plan view, Fig. 6, is rotating as indicated by the arrow, looking down, the slip stream will strike the left side of the fins (looking forward from the tail) at an angle corresponding to the pitch of the blades, and the lateral pressure of the air tends to swing the body of the helicopter in the direction of rotation of the sustaining air screw, thereby neutralizing to a certain extent the torque tending to turn the body in a direction opposite to that of the sustaining air screw. However, due to the low velocity of the slip stream the torque will not be completely neutralized, and it will be necessary to fall back upon additional control surfaces to completely counteract the torque of the lifting air screw. In order that such control surfaces may not be unnecessarily large, a pusher type of propeller 9 is provided and driven by the engine driving the sustaining air screw so that the speed of the two will have uniform ratio, which will be approximately about 12 to 1. The pusher propeller should run at a high speed to obtain a high velocity slip stream which will make it possible to reduce the size of the control surfaces to a minimum. To counteract the torque of the pusher propeller 9 which tends to rotate the nacelle around the axis "Y" of the engine in a direction opposite to the rotation of the propeller, adjustable fins 13 secured to the tail booms 10 are disposed, a short distance to the rear of the propeller, radially from the axis of the slip stream of the pusher propeller with their faces parallel thereto. These fins lie in the path of the rotating slip stream which is dampened by the fins. This damping effect sets up moments in the fins which counteracts the tendency of the torque of the pusher propeller to rotate the nacelle in a direction opposite to the rotation of the propeller.

The lower vertical fin 13' is hinged near the axis of the fin assembly so as to rotate or swing freely in a plane at right angles to the axis of the slip stream, and is connected by cables 14 to the horns 15 of centrally disposed rudders 12 so that when it swings it will cause the rudders to rotate a corresponding distance around their vertical axis 16. The rudders 12 are provided to assist in counteracting the torque of the sustaining air screw and are actuated automatically by the fin 13' when acted upon by the rotating slip stream. The degree of movement will depend entirely upon the slip stream velocity which is in proportion to the torque. As an illustration, suppose the pusher propeller is rotating clockwise as indicated by the arrow in Fig. 3, and the sustaining air screw is rotating anti-clockwise as indicated by the arrow in Fig. 6. The rotation of both slip streams will be in the same direction as the rotation of the respective air screws, and the slip stream of the sustaining air screw will strike the vertical fins as well as the rudders on the left side and partially counteract the torque of the sustaining air screw. The rotation of the slip stream of the pusher propeller will be clockwise and the lower part of the slip stream will impinge on the right side of the fin 13' and cause it to swing to the left, which movement through the intermediary of cables 14 cause the rudders 12 to swing to the left. The slip stream acting upon the left side of the rudders 12, which will be hereinafter referred to as torque rudders, will set up additional moments to counteract the torque of the sustaining air screw. Any number of the fins 13 may be hinged to operate the torque rudders, but it is preferred to use one of the vertical fins so that when the helicopter is in a glide with the power shut off the fin and the rudders will remain in a plane vertical to and parallel with the axis of the nacelle and direction of flight. If one of the lateral fins is used cases will arise in forward flight with power cut off where the fin will have a positive angle of attack which will set up moments tending to swing the fin which will operate the torque rudders at a time when they should be neutral. The above arrangement of the fin 13' and the torque rudders in the rotating slip stream of the pusher propeller make their operation and the counteracting of the torque in the sustaining air screw automatic and independent of the will of the pilot.

Due to the downward pressure exerted on the slip stream of the pusher propeller 9 by the slip stream of the sustaining air screw, the latter slip stream will be bent downward as indicated by the dotted lines "C" in Fig. 1, and the axis "Y" of the pusher propeller 9 should be so disposed with reference to the axis "X" of the nacelle and the tail unit that the downward pressure of the slip stream of the sustaining air screw will cause the axis of the slip stream of the pusher propeller to pass through the longitudinal axis of the tail unit.

In the cock-pit 17 of the nacelle is located the control stick 18 which operates the elevator 19 through the intermediary of cables 20 connecting the control stick with horns 21 on the elevator. The elevator, under the control of the pilot, regulates the horizontal inclination of the helicopter and the axis of the sustaining air screw either in horizontal translation or in vertical ascent or descent, and is the primary control for producing an increase or decrease in the horizontal component set up by the sustaining air screw. Located forward of the elevator is an adjustable stabilizer 27 which may be under the control of the pilot to balance the machine in forward flight in the same manner as in airplanes.

Foot pedals 22 are located also in the cock-pit for controlling or operating the directional control rudders 23 through the intermediary of cables 24 connecting the foot pedals with horns 25 of the rudders which are hinged to the rear end of the torque fins 11. The directional control rudders 23, on each side of the axis of the tail unit, are connected by cross bars 26 but have no connection with the torque rudders 12, and therefore operate independently.

The helicopter is provided with a suitable landing gear 28 under the nacelle 5 and with a tail wheel 29 of such dimensions that when the helicopter is at rest on the ground the axis of the sustaining air screw will be almost vertical, with possibly a slight forward inclination to overcome any tendency of the machine to tip or move backward in rising off the ground due to air currents.

Figs. 7, 8, 9 and 10 illustrate in detail the sustaining air screw which comprises a hub 2 having a plurality of ears 31 extending radially therefrom, to each of which is pivoted depending pairs of forks 32 of a tubular member 33 extending radially from the hub and which is articulated to rotate a limited distance in an upward direction but which is restricted in its downward movement by a downward extension 34 of the forks making contact with the forks of the opposite member or against a stop 35 on the hub. This arrangement supports the blades when at rest on the ground.

The longitudinal axis of the tubular member 33 is above its pivoting point and any outward force exerted on the inner end of the member will have a tendency to rotate the member in a downward direction. This action will be referred to later as a means for causing the blades to attain a negative pitch.

An air screw blade or vane 1 tapering toward its root to form a shaft 37, has its shaft 37 rotatably and loosely mounted within the tubular member 33, and the root end articulated to the inner end of the tubular member by a ball and socket joint 38 which prevents the blade being thrown outwardly by centrifugal force. The outer end 41 of each tubular member has a depending lug 39 off center, toward the leading edge of the blade, to which is pivoted an arm 40 fixed to the shaft 37 of the blade which limits the movement of the blade to an arc equal to the difference between the desired positive and negative pitch of the blade. The outer end 41 of the cylindrical member is laterally expanded to permit this movement and the inner walls thereof act as stops against which the shaft rests. This arrangement permits the longitudinal axis "Z" of the blade to swing through a conical path around the axis "V" extending through the pivot 42 and the ball and socket joint 38, which of course changes the pitch of the blade in proportion. When a torque force is applied to the drive shaft tending to rotate the blade in the direction of the leading edge as indicated by arrow in Fig. 7, the drag on the blade overbalances the moments set up by centrifugal force acting through the lever system and causes the blade to rotate around the pivot 42 and attain a position shown by the axial line "Z—1" in Fig. 7 and a positive pitch as illustrated in Fig. 10. When the torque is removed the drag on the blade ceases and the moments already set up in the lever system by centrifugal force causes the blade to swing forward and attain a negative pitch as shown by the axial line "Z—2" in Fig. 7 and as illustrated in Fig. 9. The degree of change in pitch will depend upon requirements.

When an air screw having blade articulated as illustrated and described herein, is revolved rapidly, centrifugal force tends very strongly to maintain the blades in a plane at right angles to the axis of the hub, while the thrust tends to swing the blades in the direction of thrust. The resultant of the forces keeps the blades slightly disposed angularly to a plane at right angles to the axis of the hub, and all lifting forces will be transmitted to the nacelle or body of the helicopter through the axis of the sustaining air screw and perpendicular to the center of gravity, which will make the helicopter fairly stable under all conditions of flight and require few controls to maintain stability. When the torque driving the air screw is removed the blades immediately attain a negative pitch and continue revolving in the same direction, acting as a windmill and permitting a slow descent without power either vertically or in a forward glide.

The helicopter described above presents additional interesting features.

(a) By utilizing a single sustaining air screw with freely articulated blades as a propelling means the weight of the entire machine is materially reduced and the aerodynamic and mechanical efficiency is materially increased when compared with the present practice of having a separate sustaining and propelling unit.

(b) The small auxiliary pusher propeller utilized for obtaining a positive control under all conditions of flight when engine is running also acts as a propeller for forward translation and the amount of power consumed by the auxiliary propeller is negligible when the high efficiency of the large sustaining air screw is taken into consideration.

(c) The stoppage of the engine does not prevent vertical descent or forward translation at a slow speed. By inclining the axis of the sustaining air screw to the rear of the vertical it will rotate automatically if disconnected from the engine by the clutch, and the machine may be brought down in a glide.

(d) By employing a single air screw for sustentation and forward propulsion, the drive shaft may be made very short and light and the reduction gear very much simplified. If a two bladed airscrew is used the storage problem is very much simplified.

(e) By panelling the space between the upper and lower tail booms on each side of the longitudinal axis of the machine and forming a tunnel for the slip stream of the pusher propeller, and utilizing such panels as fins to counteract the torque of the sustaining air screw, the amount of surface that would ordinarily be required in the torque rudders may be greatly reduced.

The invention as a whole satisfies all the conditions required of a helicopter and it presents advantages in seating arrangement, automatic stabilization, economy of weight and ease of pilotage superior to most machines of this type.

It is to be understood that the invention is not limited to the details of construction described or shown and that modification may be incorporated without departure from the principles of the invention and the spirit of the following claims:

What is claimed is:—

1. In a helicopter the combination of a body, a sustaining and propelling system comprising a motor attached to the body and driving a single sustaining air screw above the body and having a series of articulated blades adapted to attain a positive pitch when a torque is applied to drive the air screw and a negative pitch when the torque is removed, the axis of said air screw being forwardly inclined with reference to the longitudinal axis of the body so that the upward thrust will have a forward horizontal component, controllable means embodied in the tail unit for increasing or decreasing said forward inclination with reference to the direction of flight, means embodied in the tail unit for automatically neutralizing the torque of said air screw, and controllable means embodied in the tail unit for directional and lateral control, said plural means being disposed in the slip stream of a propeller driven by the motor driving the sustaining air screw.

2. In a helicopter a body, a motor attached thereto, a single sustaining air screw driven by said motor, and a system for counteracting the tendency of the torque of the rotating air screw to rotate the body of the helicopter in a direction opposite to that of the rotating air screw, comprising in combination, a tail unit attached to said body, a motor driven propeller adapted to direct its slip stream upon the tail unit, one or more vertical rudders forming a part of the tail unit and disposed in the slip stream of said propeller, one or more pivoted fins so disposed in the slip stream of said propeller forward of the rudders that the rotating slip stream will cause the fins to rotate in the same direction as the rotating slip stream, and connecting means between fins and rudders to cause the rudders to rotate and present a side to the slip stream that will set up moments tending to rotate the body of the helicopter in the direction of rotation of the sustaining air screw and thereby counteract its torque.

3. In an air screw, a hub attachable to a drive shaft, a plurality of tubular arms disposed radially from the hub and pivoted thereto to move in a radial plane parallel to the axis of the hub and having their longitudinal axes above the pivoting points, a blade or vane articulated within the root end of each tubular arm, said blade or vane tapering to a shaft which is loosely mounted within the tubular arm, and means connecting the blade to the tubular arm to cause the blade to attain a positive pitch when a torque is applied to rotate the air screw in the direction of the leading edge of the blade and to attain a negative pitch when the torque is removed.

4. In a helicopter, a body, a motor attached thereto, a sustaining air screw driven by said motor, a tail unit having a vertical torque rudder and a controllable rudder secured to said body, and adjustable fins in connection with said torque rudder for automatically counteracting the torque of the sustaining air screw.

5. In a helicopter a body, a motor mounted in said body, a sustaining air screw driven by said motor, a tail unit having vertical torque rudders, secured to said body, a propeller positioned between the rear of said motor and tail unit and driven by said motor, adjustable fins juxtaposed to said propeller and means securing the fins to said torque rudders for automatically counteracting the torque of the sustaining air screw.

6. In a helicopter a body, a motor mounted in said body, a sustaining air screw driven by said motor, a tail unit having vertical torque rudders secured to said body, vertical fins positioned between said tail unit and body, adjustable fins positioned between said vertical fins and body, and a propeller driven by said motor juxtaposed to said adjustable fins whereby a moment is produced to automatically neutralize the torque of the sustaining air screw and propeller.

7. In a helicopter, a body, a nacelle having a motor therein positioned in said body, a sustaining air screw driven by said motor, a propeller mounted for rotation in the rear of said nacelle and driven by said motor, a tail unit, means securing the tail unit to the nacelle in the rear of said propeller, side vertical fins positioned on said securing means parallel to the axis of the propeller, and adjustable fins positioned between said propeller and tail unit, said adjustable fins having a swinging portion connected with a part of the tail unit and with said vertical fins being so positioned as to neutralize the torque of the sustaining air screw and of the propeller.

8. In a helicopter a body, a motor attached thereto, a tail unit having vertical torque rudders secured to said body, a sustaining air screw driven by said motor, said air screw comprising a drive shaft, tubular members, means pivotally securing the members to the drive shaft, means mounting said airfoils in the tubular members whereby the pitch of said airfoils is automatically changed from positive to negative depending upon the torque applied, and means positioned between said motor and tail unit for automatically conteracting the torque of the air screw.

9. In a helicopter a body, a motor mounted in said body, a sustaining air screw having a driving shaft connected with said motor, airfoils, means for securing said airfoils to the driving shaft, said means including a hub, tubular members pivoted to said hub and members permitting the pitch of said airfoils to automatically change from negative to positive depending upon the torque applied, and a system for counteracting the tendency of the torque of the rotating air screw comprising a tail unit having one or more rudders, a propeller positioned between said tail unit and motor and driven by the motor, adjustable fins juxtaposed to said propeller, and means connecting the fins and rudders.

10. In a helicopter, the combination of a body, a sustaining air screw, a motor for driving said air screw, a propeller for forward translation, means for driving the sustaining air screw and propeller, a tail unit disposed in the slip stream of the propeller, said unit including controllable means for increasing or decreasing the inclination of the axis of the sustaining air screw with reference to the direction of flight, means for directional control, means for lateral control, and means for automatically neutralizing the torque of the sustaining air screw.

11. In a helicopter, the combination of a body, a sustaining air screw, a motor for driving the air screw, a propeller driven by said motor for forward translation, a control unit disposed in the slip stream of the propeller, said control unit having airfoil surfaces for neutralizing the torque of the sustaining air screw, and means connected with said airfoils for utilizing the rotational energy of the propeller slip stream for automatically actuating said airfoil surfaces to a moment proportional to the torque of the sustaining air screw.

12. In a helicopter, the combination of a body, a sustaining air screw, a propeller, a motor for driving said propeller, airfoil surfaces, means disposed in the slip stream of said propeller, and connecting links between said means disposed in the propeller slip stream and the airfoils whereby said airfoils are automatically actuated to produce a moment neutralizing the torque of the sustaining air screw.

13. In a helicopter a body, a motor attached thereto, a sustaining air screw, a propeller, a motor for driving said air screw and propeller, a tail unit secured to said body, said unit consisting of vertical torque rudders, means for lateral and directional control, and means connected with said torque rudders for automatically counteracting the torque of said sustaining air screw and propeller.

14. In a helicopter the combination of a body, a sustaining and propelling system comprising a motor attached to the body and driving a single sustaining air screw above the body, the axis of said air screw being forwardly inclined with reference to the longitudinal axis of the body so that the upward thrust will have a forward horizontal component, controllable means embodied in the tail unit for increasing or decreasing said forward inclination with reference to the direction of flight, means embodied in the tail unit for automatically neutralizing the torque of said air screw, and controllable means embodied in the tail unit for directional and lateral control, said plural means being disposed in the slip stream of a propeller driven by the motor driving the sustaining air screw.

15. In an aircraft, a body, a motor mounted therein, a propeller driven by said motor, control surfaces for maintaining stability having anti-torque surfaces, and means utilizing the rotative energy of the rotating slip stream generated by said propeller to automatically actuate said anti-torque control surfaces to set up a moment neutralizing any counter torque tending to rotate the body of the aircraft in a direction opposite to the rotation of said propeller.

16. In an aircraft, a body, a motor mounted therein, a propeller driven by said motor, control surfaces, anti-torque surfaces, fins positioned in and adapted to be actuated by the slip stream of said propeller, and means connecting the fins to the anti-torque surfaces to actuate said anti-torque surfaces so as to set up a moment neutralizing any counter torque action tending to rotate the body of the aircraft in directions opposite to the rotation of the propellers.

17. In a helicopter, a body, a motor mounted therein, a sustaining air screw driven by said motor, control surfaces, a propeller driven by the motor, fins positioned in the slip stream of the propeller, and means connecting the fins with the control surfaces to set up a moment neutralizing counter torque tending to rotate the body.

18. In a helicopter, a body having a motor mounted therein, a sustaining air screw and a propeller driven by said motor, control surfaces mounted in the air stream and adapted to create a moment neutralizing any counter torque tending to rotate the body in a direction opposite to the rotation of the sustaining air screw, fins mounted in the air stream of said propeller, and means connected to said fins and control surfaces utilizing the rotative energy of the air stream of the propeller to actuate said control surfaces for producing a moment proportional to the counter torque on the body.

SIDNEY P. VAUGHN.